(12) United States Patent
Yanakawa (10) Patent No.: US 9,616,500 B2
(45) Date of Patent: Apr. 11, 2017

(54) GUIDE BUSH ADJUSTING DEVICE

(71) Applicants: CITIZEN HOLDINGS CO., LTD., Tokyo (JP); CITIZEN MACHINERY MIYANO CO., LTD., Nagano (JP)

(72) Inventor: Shozen Yanakawa, Sayama (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 127 days.

(21) Appl. No.: 14/382,635

(22) PCT Filed: Feb. 13, 2013

(86) PCT No.: PCT/JP2013/053320
§ 371 (c)(1),
(2) Date: Sep. 3, 2014

(87) PCT Pub. No.: WO2013/132974
PCT Pub. Date: Sep. 12, 2013

(65) Prior Publication Data
US 2015/0047480 A1    Feb. 19, 2015

(30) Foreign Application Priority Data
Mar. 8, 2012  (JP) .................. 2012-051555

(51) Int. Cl.
*B23B 19/02* (2006.01)
*B23B 3/00* (2006.01)
(Continued)

(52) U.S. Cl.
CPC .......... *B23B 13/123* (2013.01); *B23B 13/126* (2013.01); *B23B 31/201* (2013.01); *B23Q 1/763* (2013.01); *Y10T 82/2593* (2015.01)

(58) Field of Classification Search
CPC .... B23B 13/126; B23B 31/201; B23B 13/123
See application file for complete search history.

(56) References Cited

U.S. PATENT DOCUMENTS 4,258,598 A    3/1981  Hoffmann
4,971,339 A *  11/1990  Treff ................ B23B 31/207
                                                279/132
(Continued)

FOREIGN PATENT DOCUMENTS

EP    1 731 248      12/2006
JP    48-65583       9/1973
(Continued)

OTHER PUBLICATIONS

Extended European Search Report issued Oct. 5, 2015 in corresponding European Patent Application No. 13757658.3.
(Continued)

*Primary Examiner* — Sara Addisu
(74) *Attorney, Agent, or Firm* — Wenderoth, Lind & Ponack, L.L.P.

(57) ABSTRACT

A guide bush adjusting device includes a drawbar (a mobile body) displaceable relative to a guide bush sleeve (cylindrical body). The drawbar is formed from a screw connection member (a connection member) which is connected to a guide bush housed in the guide bush sleeve (a cylindrical body), and an operation member configured to displace the screw connection member. The guide bush adjusting device adjusts an inner diameter of the guide bush by releasing the operation member from its fixation, displacing the drawbar, moving the guide bush with respect to the guide bush sleeve via the drawbar to thereby position the guide bush, and fixing the operation member of the drawbar (mobile body) at a predetermined position.

6 Claims, 7 Drawing Sheets

(51) Int. Cl.
 *B23B 13/12* (2006.01)
 *B23B 31/20* (2006.01)
 *B23Q 1/76* (2006.01)

(56) References Cited

U.S. PATENT DOCUMENTS

| | | | | |
|---|---|---|---|---|
| 5,860,776 | A | * | 1/1999 | Sato .................. B23B 31/265 408/56 |
| 6,036,409 | A | * | 3/2000 | Rissler ............... B23B 51/107 408/111 |
| 7,303,363 | B2 | | 12/2007 | Krause et al. |
| 2004/0040424 | A1 | * | 3/2004 | Smith ............... B23B 31/4033 82/124 |
| 2007/0199415 | A1 | | 8/2007 | Ando et al. |

FOREIGN PATENT DOCUMENTS

| JP | 3-5361 | 2/1991 |
|---|---|---|
| JP | 10-138007 | 5/1998 |

OTHER PUBLICATIONS

Office Action issued May 30, 2016 in corresponding Korean Application No. 10-2014-7024489.
International Search Report (ISR) issued Apr. 9, 2013 in International (PCT) Application No. PCT/JP2013/053320.

\* cited by examiner

GUIDE BUSH ADJUSTING DEVICE

TECHNICAL FIELD

The present invention relates to a guide bush adjusting device configured to adjust an inner diameter dimension of a guide bush.

BACKGROUND ART

Guide bush units for machine tools have heretofore been known in which a guide bush with a predetermined adjusted inner diameter dimension guides a bar material inserted in the guide bush.

One of what are known as guide bush adjusting devices configured to adjust the inner diameter dimension of the guide bush includes: a guide bush sleeve configured to house the guide bush; a guide bush adjusting nut provided to be displaceable with respect to the guide bush sleeve; and a fixing device to fix the guide bush adjusting nut to the guide bush sleeve (see Patent Literature 1, for example).

The guide bush adjusting device is configured to adjust the inner diameter dimension of the guide bush by: connecting the guide bush adjusting nut and the guide bush together; releasing the guide bush adjusting nut from its fixation, displacing the guide bush adjusting nut in a rotational direction by rotating the guide bush adjusting nut, and fixing the guide bush adjusting nut at a predetermined rotational position; and moving the guide bush with respect to the guide bush sleeve, and positioning the guide bush.

Patent Literature 1: Japanese Utility Model Registration Application Publication No. Sho 61-99404 (Claim of Utility Model Registration, and FIGS. 1 to 4)

SUMMARY OF INVENTION

Technical Problem

However, an internal thread portion and an expandable slit portion, which constitute the guide bush adjusting nut are integrated together. For this reason, when the guide bush adjusting nut is fixed at the predetermined rotational position, the slit portion of the guide bush adjusting nut is expanded in response to the fixation. This makes it likely that: the guide bush adjusting nut is deformed partially; and the position of a tip end side of the guide bush adjusting nut accordingly changes.

This position change (the change in the position of the tip end side of the guide bush adjusting nut) and the like cause a problem that it is difficult to adjust the inner diameter dimension of the guide bush with high precision because the position of the guide bush with respect to the guide bush sleeve is changed, and the inner diameter dimension of the guide bush is changed accordingly.

SUMMARY OF THE INVENTION

To solve the problem, a guide bush adjusting device of the present invention includes: a cylindrical body configured to house a guide bush; a mobile body provided to be displaceable with respect to the cylindrical body; and a fixing device to fix the mobile body to the cylindrical body. The guide bush adjusting device is configured to adjust an inner diameter dimension of the guide bush by connecting the mobile body and the guide bush together, releasing the mobile body from its fixation, displacing the mobile body, and fixing the mobile body at a predetermined position, and moving the guide bush with respect to the cylindrical body, and positioning the guide bush. Here, the mobile body includes a connection member configured to be connected to the guide bush, and an operation member configured to operate displacement of the connection member. The connection member and the operation member are connected together by use of an engagement section including a recessed portion and a projecting portion to be loosely fitted (fitted loosely by means of play) to each other. The operation member is fixed by use of the fixing device.

In the guide bush adjusting device of the present invention, it is preferable that the fixing device be configured to fix the mobile body by elastically (resiliently) enlarging a diameter of the operation member, and pressing the operation member against the cylindrical body.

In the guide bush adjusting device of the present invention, it is preferable that the mobile body be displaced in a rotational direction with respect to the cylindrical body.

In this case, it is preferable that the engagement section be formed from a pin as the projection portion, and the recessed portion into which the pin is inserted.

Furthermore, when a hole is applied as the recessed portion, it is preferable that the pin and the hole be loosely fitted to each other in a way as to be relatively displaceable within a predetermined range in a direction of movement of the mobile body, and that the pin include a retainer portion configured to prevent the pin from coming out of the hole, and obtained by forming a tip end of the pin, which has passed through the hole, in a size larger than that of the hole.

Advantageous Effects of Invention

The thus-configured guide bush adjusting device of the present invention prevents a change in the position of the connection member and the like by use of the engagement section, even if the position of the operation member is changed when the operation member is fixed using the fixing device.

Accordingly, a change in the position of the guide bush connected to the connection member is prevented, and a change in the inner diameter dimension of the guide bush is prevented. This brings about an effect that the inner diameter dimension of the guide bush can be precisely adjusted and maintained.

The change in the inner diameter dimension of the guide bush can be suppressed, in particular even when the position of the operation member is changed easily because the fixing device is configured to fix the mobile body by elastically enlarging the diameter of the operation member, and thus pressing the operation member against the cylindrical body.

It should be noted that the mobile body may be of a type which adjusts the inner diameter dimension of the guide bush by being displaced in the rotational direction with respect to the cylindrical body. An advantage of this case is that the engagement section can be easily and simply formed from: the pin as the projecting portion; and the recessed portion in which the pin is inserted.

The retainer portion in the pin will never allow the operation member and the connection member to become separated from each other when: the pin is loosely fitted in the hole as the recessed portion in a way that the pin and the hole are relatively displaceable in the predetermined range in the direction of the movement of the mobile body; and the pin includes the retainer portion configured to prevent the pin from coming out of the hole, and obtained by forming the tip end of the pin penetrating through the hole into the size larger than that of the hole. For this reason, once the operation member is taken out of the cylindrical body by releasing the operation member from the fixation by the fixing device, the connection member, together with the operation member, is taken out of the cylindrical body. Accordingly, the connection member will never be left inside the cylindrical body.

DETAILED DESCRIPTION OF THE INVENTION

Figure 1:
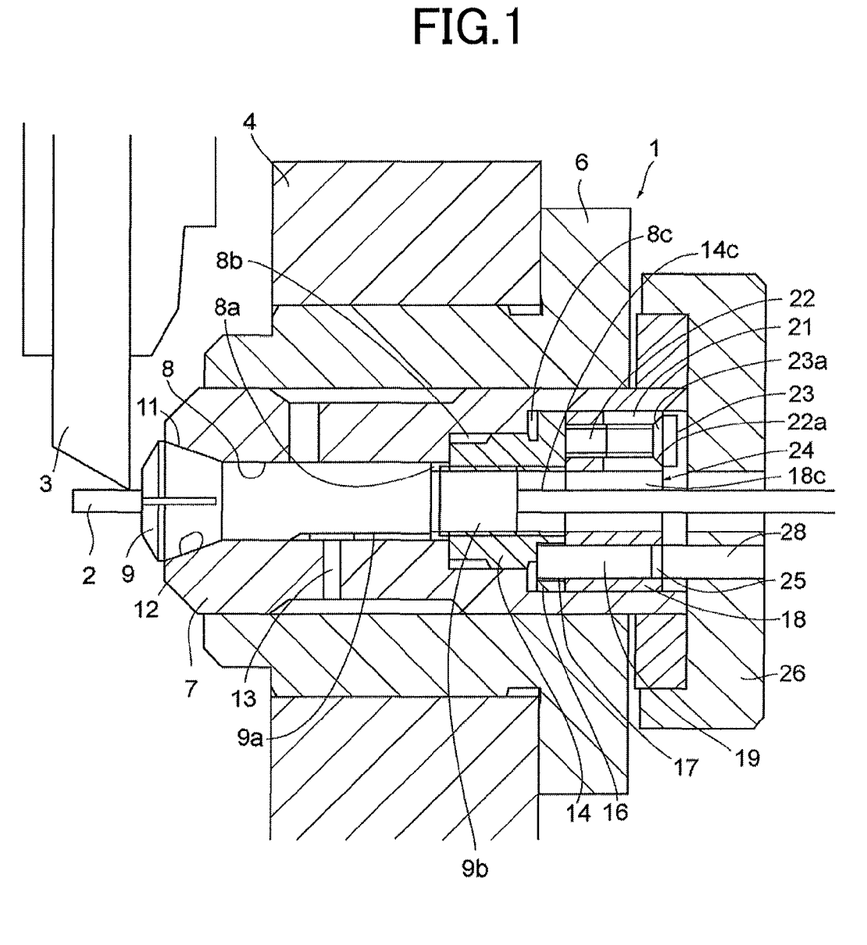
FIG. 1 is a main part front cross-sectional view of a guide bush unit (a diagram showing a cross section taken along the A-A line of FIG. 2B).

FIG. 1 shows a cross-sectional view of a main part of a guide bush unit 1 which includes a guide bush adjusting device of the present invention.

The guide bush unit 1 is provided on an automatic lathe which is a machine tool. The guide bush unit 1 guides a bar material 2, which is held by a main spindle of the automatic lathe, in a way to allow the bar material 2 to move in an axial center direction and rotate around an axial center. The automatic lathe is capable of machining a part of the bar material 2, which juts out from a tip end of the guide bush unit 1, with a tool 3.

The guide bush unit 1 is attached to a guide bush support base 4 which is uprightly installed on a bed side of the automatic lathe. The guide bush unit 1 includes a guide bush holder 6 which is detachably attached to the guide bush support base 4. A cylindrical guide bush sleeve (cylindrical body) 7 is integrally inserted in and fixed to the guide bush holder 6.

The guide bush sleeve 7 has a three-stepped through-hole 8 in its center, and the diameter of the through-hole 8 is different among the three steps. A guide bush 9 is inserted in a small-diameter hole portion 8a on a tip end side of the through-hole 8. A tapered surface 12 corresponding to a tapered surface 11 of the guide bush 9 is formed on a tip end-side circumferential surface of the through-hole 8.

The guide bush 9 is placed inside the guide bush sleeve 7 with the tapered surfaces 11, 12 in contact with each other, and with a base end portion 9b projecting into a middle-diameter hole portion 8b which continues to the small-diameter hole portion 8a.

A key groove 9a is formed in a part of a peripheral surface of the guide bush 9. A rotation stopper pin 13 is inserted in the key groove 9a in a way that the rotation stopper pin 13 projects into the smaller-diameter hole portion 8a in the bush sleeve 7. Once the guide bush 9 is inserted and installed in the guide bush sleeve 7, the rotation stopper pin 13 and the key groove 9a restrain the rotation of the guide bush 9 in the guide bush sleeve 7.

A hollow cylindrical screw connection member 14 provided with an internal thread to threadedly engage with an external thread formed on the base end portion 9b of the guide bush 9 is rotatably inserted in the middle-diameter hole portion 8b.

Figure 2A:
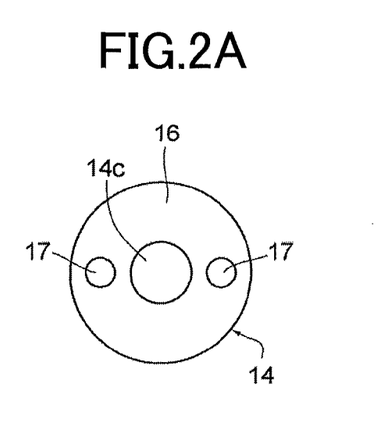
FIG. 2A is a right side view of a screw connection member.

A tip end of the screw connection member 14 is in contact with an end surface of the middle-diameter hole portion 8b. A flange 16 is provided to a base end portion of the screw connection member 14. The flange 16 is situated inside a large-diameter hole portion 8c which continues to the middle-diameter hole portion 8b. As shown in FIG. 2A, engagement holes 17 are formed in the flange 16.

A hollow cylindrical operation member 18 is rotatably inserted in the large-diameter hole portion 8c. Pins (projecting portions) 19 are projectingly provided to a tip end surface of the operation member 18. The pins 19 are provided there by being press-fitted in holes 25 drilled in the operation member 18. The pins 19 which are projecting portions are inserted in the engagement holes 17 which are recessed portions. The diameters of the engagement holes 17 are set larger than the diameters of the pins 19, respectively, to an extent that the pins 19 have predetermined play in the engagement holes 17. Each engagement hole 17 and the corresponding pin 19 engage with each other in a loosely fitted state of being loosely fitted to each other.

Figure 2B:
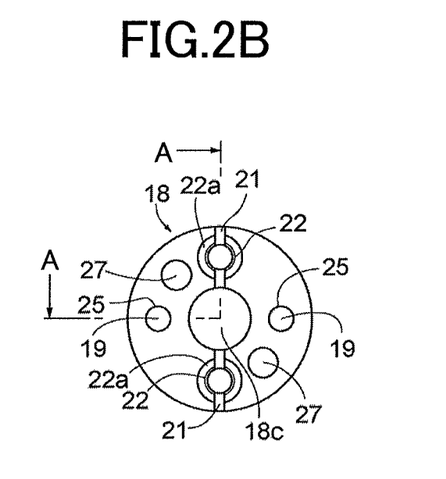
FIG. 2B is a right side view of an operation member.

As shown in FIG. 2B, slits 21 extending in an axial line direction are formed in the operation member 18. A screw hole 22 extending from a base end surface side in the axial line direction is formed between facing surfaces of each slit 21. A tapered surface 22a provided with no thread is formed at an end portion of each screw hole 22. A screw 23 is threadedly engaged with each screw hole 22.

Figure 3:
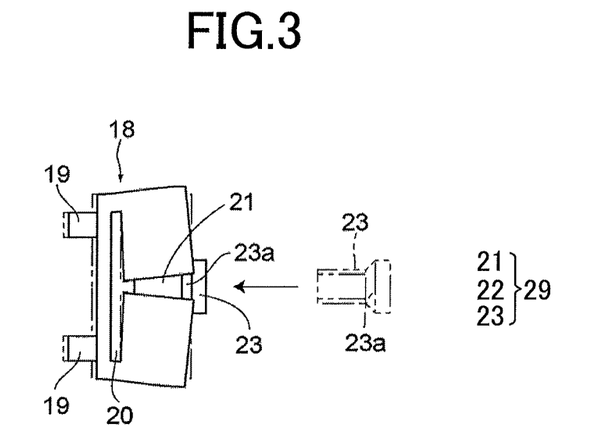
FIG. 3 is a plan view showing how the diameter of the operation member is enlarged.

As shown in FIG. 3, a tapered surface 23a is formed between a head portion and a shank of each screw 23. In the operation member 18, a slit 20 extending in a circumferential direction is formed continuing to an end portion of each slit 21. Threaded engagement of the screws 23 with the screw holes 22 makes the tapered surfaces 23a of the screws 23 press the tapered surfaces 22a of the screw holes 22, and thereby the base end portion of the operation member 18 elastically expands in its radial directions.

Figure 4:
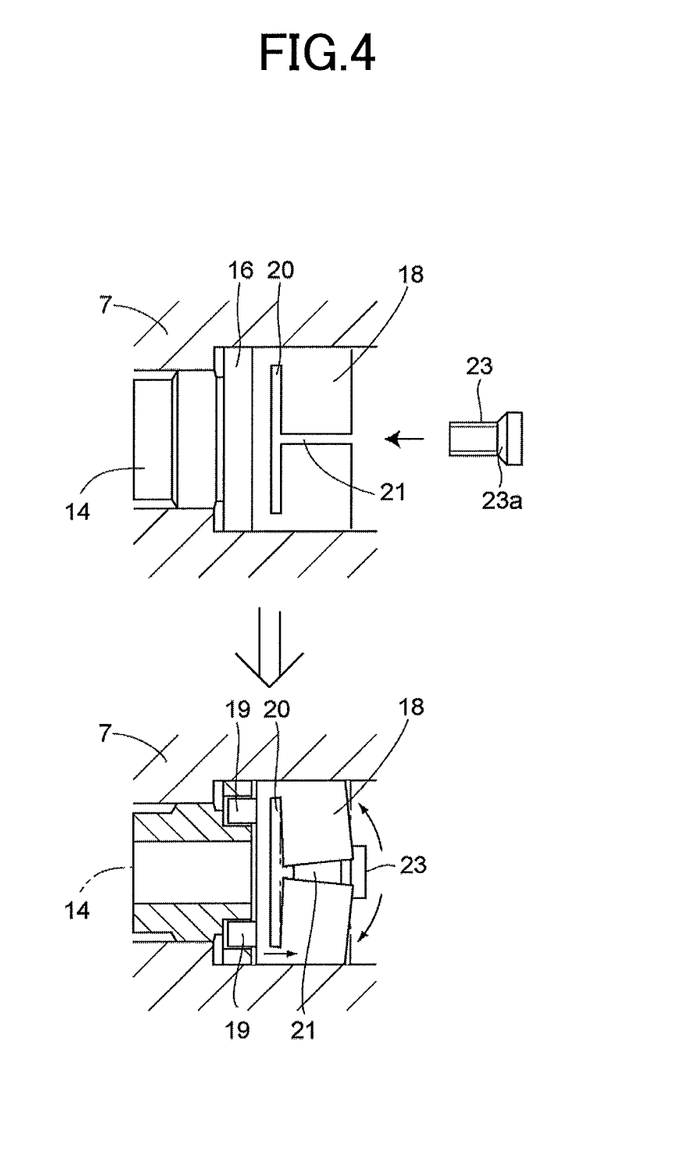
FIG. 4 is a view including plan views showing how the operation member is fixed to a guide bush sleeve.

As shown in FIG. 4, when the operation member 18 expands in its radial directions inside the through-hole 8, its outer peripheral surface is pressed against the peripheral surface of the large-diameter hole portion 8c.

When the outer peripheral surface of the operation member 18 is pressed against the peripheral surface of the large-diameter hole portion 8c, the operation member 18 is unrotatably positioned and fixed to the guide bush sleeve 7 with friction force.

When the screws 23 are pulled out of the screw holes 22, the base end portion returns from the elastically deformed shape to the original shape, and the outer peripheral surface of the operation member 18 is released from the state of being pressed against the peripheral surface of the large-diameter hole portion 8c. Thus, the operation member 18 is allowed to rotate relative to guide bush sleeve (cylindrical body) 7.

By releasing the fixation of the operation member 18 to the guide bush sleeve 7 and then rotating the operation member 18, the screw connection member 14 integrally rotates with the assistance of the pins 19. The slits 21, the screw holes 22 and the screws 23 constitute a fixing device 29 to fix the operation member 18 to the guide bush sleeve 7 by elastically enlarging the diameter of the base end portion of the operation member 18. The fixing device 29 is integrally provided to the operation member 18.

Since the tip end of the screw connection member 14 is in contact with the end surface of the middle-diameter hole portion 8b, and because the rotation stopper pin 13 and the key groove 9a restrain the rotation of the guide bush 9, the rotation of the screw connection member 14 makes the guide bush 9 move in the axial line direction.

As the guide bush 9 moves in the axial line direction, its inner diameter dimension is adjusted in accordance with how the tapered surfaces 11, 12 are pressed against each other. When the operation member 18 is positioned and fixed to the guide bush sleeve 7 at a predetermined rotational angle position (via screw 23, as explained above), the inner diameter dimension of the guide bush 9 can be fixed to a predetermined value.

A drawbar 24 configured to adjust the inner diameter dimension of the guide bush 9 by moving the guide bush 9 in the axial line direction is formed from: the screw connection member 14 which is a connection member to be threadedly engaged with and connected to the guide bush 9; and the operation member 18 integrally provided with the fixing device 29 (formed, for example, of slit 21, screw hole 22, and screw 23).

The screw connection member 14 and the operation member 18 are engaged with and connected to each other with the assistance of an engagement section including the engagement holes 17 and the pins 19 which are loosely fitted to one another.

The drawbar 24 rotates relative to the guide bush sleeve (cylindrical body) 7 as the screw connection member 14 rotates integrally in accordance with the rotational operation of the operation member 18. Thus, the drawbar 24 constitutes a mobile body to be displaced in the rotational direction along with its rotation with respect to the guide bush sleeve 7.

The drawbar (mobile body) 24 is fixed to the guide bush sleeve 7 using the operation member 18. The inner diameter dimension of the guide bush 9 is adjusted on the basis of the displacement of the drawbar (mobile body) 24 in the rotational direction.

The bar material 2 passes through a center hole 18c of the operation member 18 and a center hole 14c of the screw connection member 14, and is inserted through the guide bush 9. A tip end portion of the bar material 2 juts out from the guide bush 9. The inner diameter dimension of the guide bush 9 is adjusted in order for the guide bush 9 to support the bar material 2 with a slight clearance enough to allow the bar material 2 to move in the axial line direction and to rotate around the axis line.

The guide bush unit 1 guides the bar material 2 by use of the guide bush 9. The inner diameter dimension of the guide bush 9 is easily adjusted and fixed when the operation member 18 is rotated and fixed at the predetermined angle position.

Figure 5:
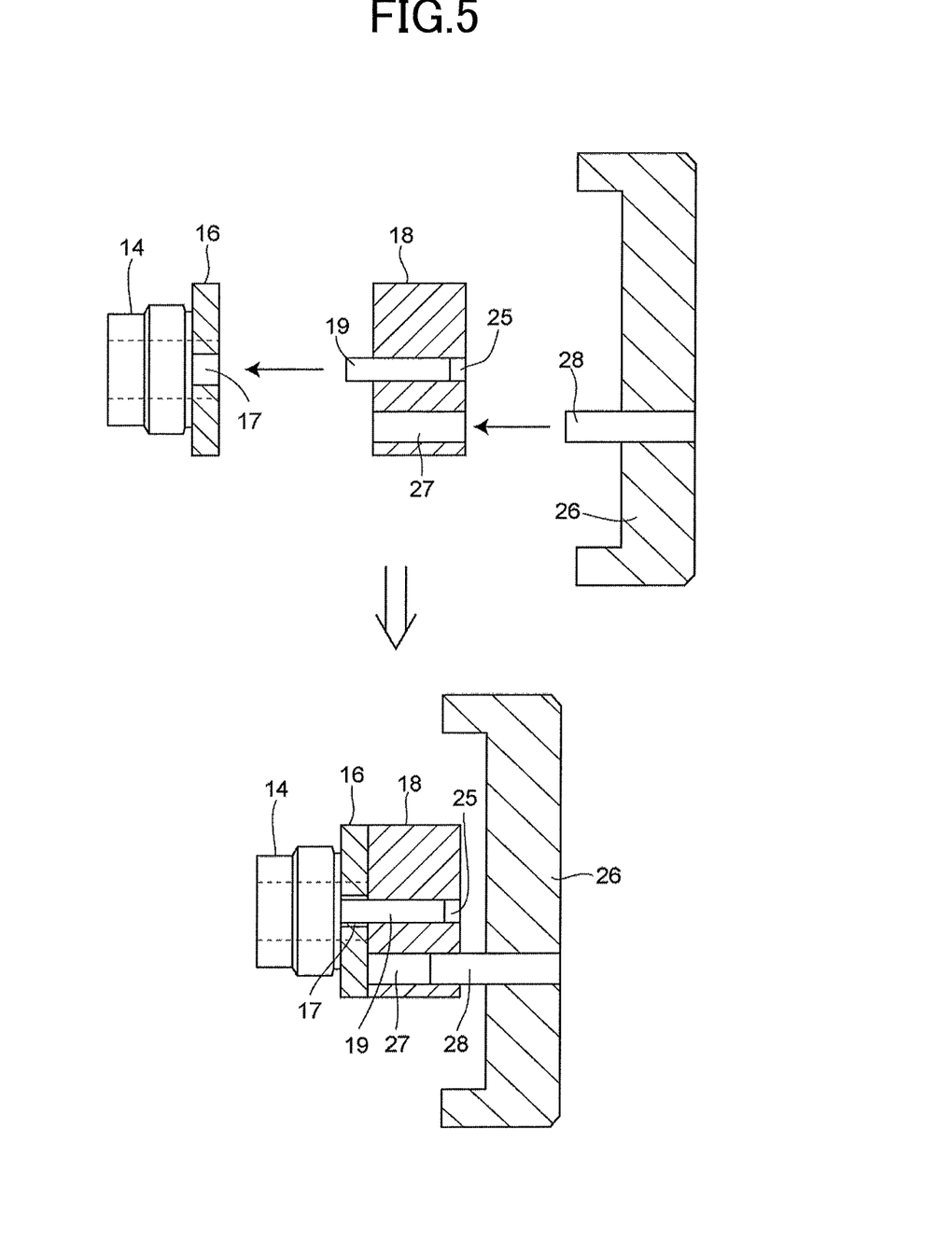
FIG. 5 is a view including main part front cross-sectional views showing how the screw connection member, the operation member and an operation handle are linked together.

In the embodiment, an operation handle 26 is rotatably fitted onto a base end side of the guide bush sleeve 7. As shown in FIG. 5, a pin 28 is projectingly provided to the operation handle 26, while a hole 27 to engage with the pin 28 is formed in the operation member 18.

The insertion of the pin 28 into the hole 27 links the operation handle 26 and the operation member 18 together. When the operation handle 26 is rotationally operated, the operation member 18 is easily rotated through the pin 28. Accordingly, the inner diameter dimension of the guide bush 9 can be adjusted easily.

The operation handle 26 may be detachably provided. By detaching the operation handle 26 after the adjustment of the inner diameter dimension of the guide bush 9, it is possible to enhance accessibility to the guide bush 9 by the main spindle.

When the operation member 18 is fixed to the side of the guide bush sleeve 7, the position of its tip end side is changed as a result of the expansion of the base end portion in the radial directions.

For example, as shown in FIG. 4, when the operation member 18 is fixed to the guide bush sleeve 7, its tip end side is likely to move slightly toward the base end side as a result of the expansion of the base end portion in the radial directions. At this time, by the movement of the pins 19 into the respective engagement holes 17, and the like, the screw connection member 14 is prevented from moving in accordance with the displacement of the tip end side of the operation member 18.

For this reason, when the drawbar (mobile body) 24 is fixed to the guide bush sleeve (cylindrical body) 7 by fixing the operation member 18 with the fixing device 29, it is possible to avoid inconvenience of moving the guide bush 9 in such a direction to draw the guide bush 9 into the guide bush sleeve 7, and thus to precisely adjust and maintain the inner diameter dimension of the guide bush 9.

It should be noted that the operation member 18 may take on any shape as long as such a shape allows the fixation to the guide bush sleeve 7 by the expansion in the radial directions. In the case of the fixation of the operation member 18 to the guide bush sleeve 7, however, a variety of displacement on the tip end side of the operation member 18 is conceivable depending on the shape and the like of the operation member 18.

Figure 6A:
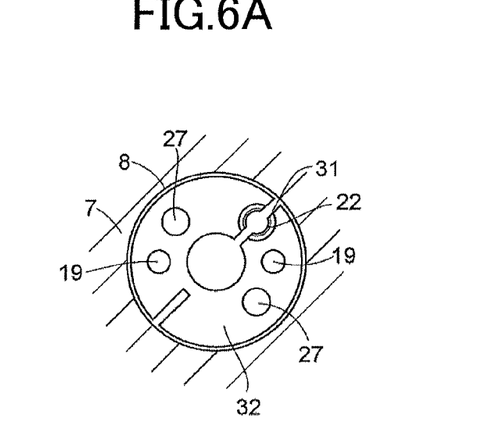
FIG. 6A is a right side view of an operation member shaped like a C-ring, and is a drawing showing how the operation member is released from its fixation.
Figure 6B:
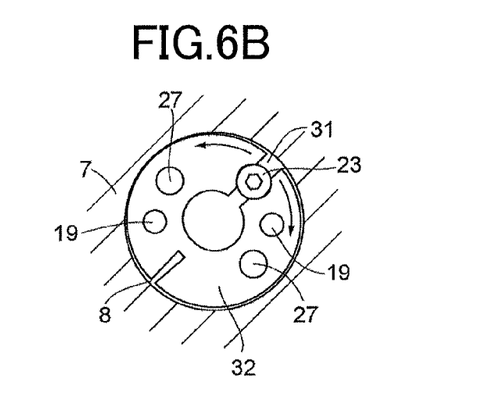
FIG. 6B is a right side view of the operation member shaped like the C-ring, and is a drawing showing how the operation member is fixed.

For example, as shown in FIGS. 6A and 6B, it is possible to provide a C ring-shaped operation member 32, shaped like the letter C in a cross-sectional view, with a slit 31 formed in only one end side of the operation member. In this case, when the diameter of the operation member 32 is enlarged, it is likely that the operation member 32 is displaced in a rotational direction in which the pins 19 come closer to each other toward an opposite end portion of the operation member 32 from the slit 31. However, the rotation of the screw connection member 14 can be suppressed by use of the play between engagement hole 17 and the corresponding pin 19, and the like. This makes it possible to precisely adjust and maintain the inner diameter dimension of the guide bush 9.

In this case, the slit 31, the screw hole 22 and the screw 23 constitute the fixing device 29 for fixing the operation member 32 to the guide bush sleeve 7 by elastically enlarging the diameter of the base end portion of the operation member 32.

Figure 7A:
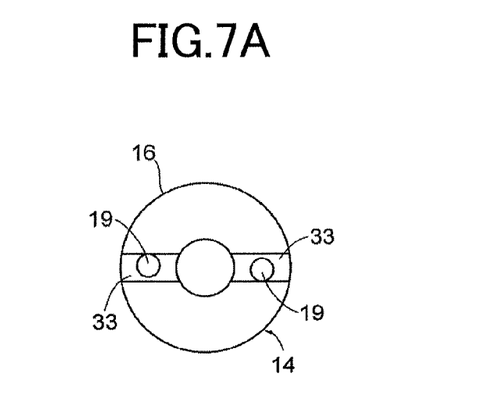
FIG. 7A is a right side view of the screw connection member, showing an engagement section which uses grooves as recessed portions.
Figure 7B:
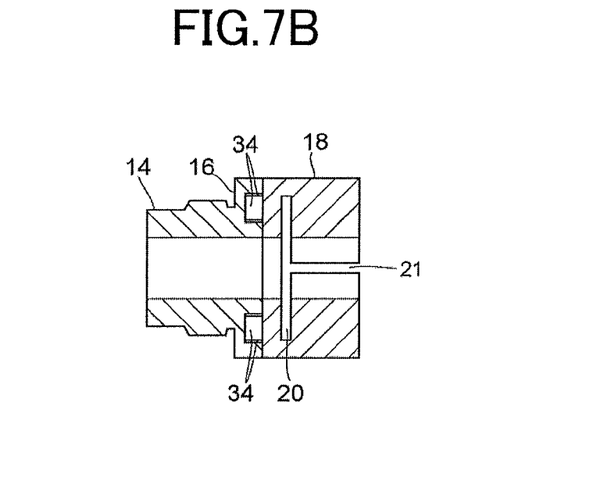
FIG. 7B is a main part front cross-sectional view of the screw connection member and the operation member, showing an engagement section which is formed from a recess-and-projecting fitting structure.

In the above embodiment, the descriptions have been provided for the example in which the engagement section is formed from the pins 19 and the engagement holes 17. Instead, however, the engagement section may be formed by combining the pins 19 and grooves 33 which are recessed portions, as shown in FIG. 7A. Otherwise, the engagement section may be formed by use of a recessed-and-projecting fitting structure 34 (obtained by combining recessed and projecting parts), as shown in FIG. 7B.

Figure 8:
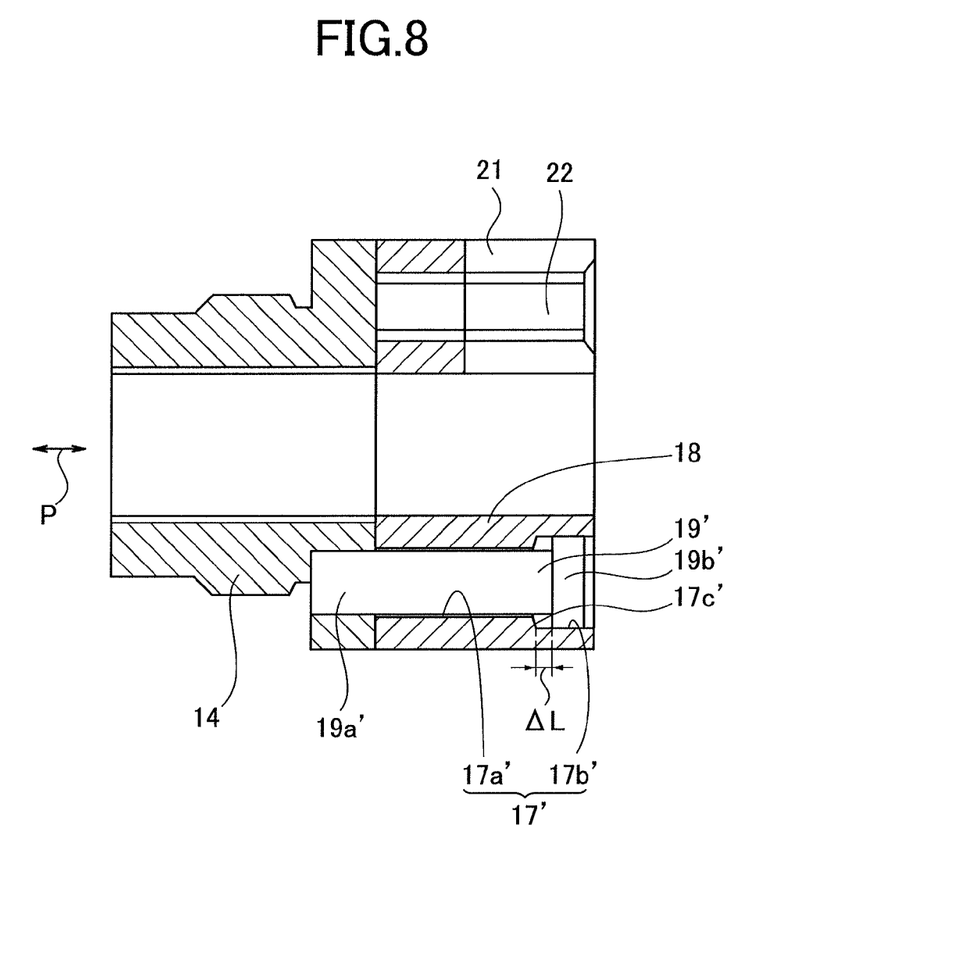
FIG. 8 is a main part cross-sectional view showing an example of a guide bush adjusting device having a configuration in which: a pin having a head portion is loosely inserted in an engagement hole formed in the operation member; and an opposite end portion of the pin from the head portion is press-fitted in the screw connection member, showing how the fixation is released.

Furthermore, the guide bush adjusting device of the present invention may include the engagement section which, as shown in FIG. 8, is formed from a pin 19' as a projecting portion and an engagement hole 17' as a recessed portion.

Specifically, the operation member 18 is provided with the engagement hole 17' penetrating therethrough in its axial line direction P, and the pin 19' is loosely inserted (loosely fitted) in the engagement hole 17'.

A shank portion 19a', and a head portion 19b' (a retainer portion) thicker than the shank portion 19a' are formed in the pin 19'. The engagement hole 17' is a stepped hole including: a shank-portion hole 17a' into which the shank portion 19a' is loosely inserted, and which is formed in a size not allowing the head portion 19b' to pass through; and a head-portion hole 17b' into which the head portion 19b' is loosely inserted.

With the pin 19' penetrating through the engagement hole 17', an end portion of the pin 19', which is opposite from an end portion at which the head portion 19b' is formed, is press-fitted in the screw connection member 14.

As a result, the head portion 19b' of the pin 19' is prevented from coming off the engagement hole 17', as well as the operation member 18 and the screw connection member 14 are kept connected to each other.

With the pin 19' penetrating through the engagement hole 17' and press-fitted in the screw connection member 14, and with the screw connection member 14 and the operation member 18 in contact with each other, a clearance with a distance ΔL is formed between the head portion 19b' of the pin 19' and a step portion 17c' of the engagement portion 17' (a boundary portion between the shank-potion hole 17a' and the head-portion hole 17b'), as shown in FIG. 8.

The distance ΔL for the clearance is set longer than a distance (a distance ΔK in FIG. 9 which will be described later) by which the position of the tip end-side portion (the end portion closer to the screw connection member 14) of the operation member 18 changes when, as shown FIG. 4, the operation member 18 is fixed to the guide bush sleeve 7 by: threadedly engaging the screws 23 with the screw holes 22 in the operation member 18; pressing the tapered surfaces 22a of the screw holes 22 with the tapered surfaces 23a of the screws 23; and thereby expanding the base end portion of the operation member 18 in the radial directions.

The diameter of the outer peripheral surface of the operation member 18 is smaller than the inner diameter of the large-diameter hole portion 8c. In addition, with the engagement hole 17' and the pin 19' in engagement with each other, the operation member 18 and the screw connection member 14 integrally move in the rotational direction. For these reasons, once the operation member 18 rotates with respect to the large-diameter hole portion 8c, the screw connection member 14 also rotates, integrally with the operation member 18, with respect to the middle-diameter hole portion 8b.

Meanwhile, the clearance between the step portion 17c' of the engagement hole 17' and the head portion 19b' of the pin 19' enables the operation member 18 and the screw connection member 14 to be relatively displaced in the axial line direction P within a range of the distance ΔL.

In the embodiment in which the operation member 18 and the screw connection member 14 are formed in this manner, the screw connection member 14 is rotatably inserted in the middle-diameter hole portion 8b of the guide bush sleeve 7 while the operation member 18 is rotatably inserted in the large-diameter hole portion 8c thereof, as in the case of the foregoing embodiment.

When the operation member 18 is rotated by the operation handle 26 and the like, the screw connection member 14 integrally rotates with the assistance of the pin 19' and the engagement hole 17'. When the operation member 18 rotates, the end surface of the operation member 18 comes into contact with the end surface of the screw connection member 14.

As the screw connection member 14 rotates, the internal thread formed in the inner peripheral surface of the screw connection member 14 threadedly engages with the external thread formed on the outer peripheral surface of the base end portion 9b of the guide bush 9. However, the contact of the tip end of the screw connection member 14 with the end surface of the middle-diameter hole portion 8b restrains the screw connection member 14 from moving in the axial line direction P, while the rotation stopper pin 13 and the key groove 9a restrain the rotation of the guide bush 9. For these reasons, the rotation of the screw connection member 14 makes the guide bush 9 move in the axial line direction P.

As the guide bush 9 moves in the axial line direction P, its inner diameter dimension is adjusted in accordance with how the tapered surfaces 11, 12 are pressed against each other.

With the inner diameter dimension of the guide bush 9 adjusted, once the operation member 18 is fixed to the guide bush sleeve 7, as in the case shown in FIG. 3, by threadedly engaging the screws 23 with the screw holes 22 and thereby elastically enlarging the diameter of the base end portion of the operation member 18, the engagement of the pin 19' and the engagement hole 17' restrains the rotation of the screw connection member 14 as well, and the inner diameter dimension of the guide bush 9 is fixed.

Figure 9:
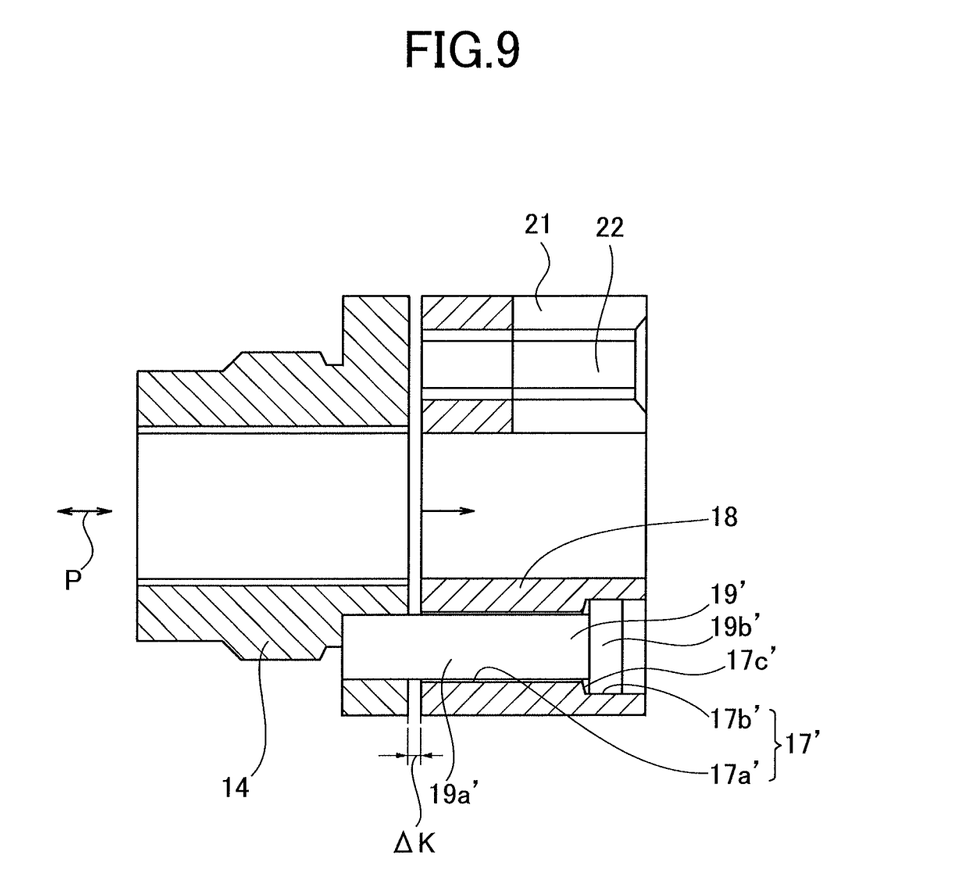
FIG. 9 is a main part cross-sectional view showing the example of the guide bush adjusting device having the configuration in which: the pin having the head portion is loosely inserted in the engagement hole formed in the operation member; and the opposite end portion of the pin from the head portion is press-fitted in the screw connection member, showing how the fixation is achieved.

When the diameter of the base end portion of the operation member 18 is elastically enlarged, the end portion of the operation member 18, which is closer to the screw connection member 14, moves back away from the screw connection member 14 (has positional displacement) by a slight distance ΔK, as shown in FIG. 9.

The operation member 18 and the screw connection member 14 are relatively displaceable in the axial line direction P within the range of the distance ΔL for the above-described clearance. For this reason, although the operation member 18 moves back in the axial line direction P, the distance ΔK of the backward movement falls within the range of the distance ΔL within which the operation member 18 and the screw connection member 14 are relatively displaceable (ΔK<ΔL). Accordingly, as shown in FIG. 9, only the operation member 18 moves back, but the screw connection member 14 does not move back.

In addition, although the clearance with the distance ΔK occurs between the operation member 18 and the screw connection member 14 in the axial line direction P, the rotation of the screw connection member 14 is restrained by the engagement between the pin 19' and the engagement hole 17'. For this reason, the guide bush 9 will never be displaced in the axial line direction P by the rotation of the screw connection member 14.

As described above, when the drawbar 24 is fixed to the guide bush sleeve 7 by fixing the operation member 18 by use of the fixing device 29, it is possible to avoid the inconvenience of moving the guide bush 9 in the direction to draw the guide bush 9 into the guide bush sleeve 7, and thus to precisely adjust and maintain the inner diameter dimension of the guide bush 9.

When the base end portion of the operation member 18 is returned to the state before the deformation by loosening the screws 23, the fixation of the operation member 18 to the guide bush sleeve 7 is released, and the operation member 18 is rotated with the operation handle 26 and the like, the screw connection member 14 also rotates because of the engagement between the engagement hole 17' and the pin 19', and is detached from the base end portion 9b of the guide bush 9.

Thereby, the operation member 18 and the screw connection member 14 are released from a load of restriction in the through-hole 8 of the guide bush sleeve 7. When the operation member 18 is pulled out rearward (in a direction away from the guide bush 9), the step portion 17c' in the operation member 18 hits the head portion 19b' of the pin 19'. Thus, the pin 19' is pulled out rearward together with the operation member 18, and the screw connection member 14 in which the pin 19' is press-fitted is also pulled out rearward.

Accordingly, it is possible to prevent a situation in which only the operation member 18 is pulled out while the screw connection member 14 is left in the through-hole 8.

FIGS. 8 and 9 show the example in which: the engagement hole 17' is formed in the operation member 18; and the pin 19' is provided to the screw connection member 14. It should be noted, however, that the guide bush adjusting device of the present invention is not limited to this example. The guide bush adjusting device of the present invention may have a configuration reverse to the one in FIGS. 8 and 9, in which the pin 19' is provided to the operation member 18 and the engagement hole 17' is formed in the screw connection member 14. This configuration also exerts the same working and effects as those of the example shown in FIGS. 8 and 9.

CROSS-REFERENCE TO RELATED APPLICATION

This application claims the benefit of priority based on Japanese Patent Application No. 2012-051555 filed with Japan Patent Office on Mar. 8, 2012, all the disclosure of which is fully incorporated herein by reference.

REFERENCE SIGNS LIST 1 guide bush unit
7 guide bush sleeve (cylindrical body)
9 guide bush
14 screw connection member (connection member)
17 engagement hole (recessed portion)
18 operation member
19 pin (projecting portion)
24 drawbar (mobile body)
29 fixing device

The invention claimed is:

1. A guide bush adjusting device, comprising:
a cylindrical body housing a guide bush;
a mobile body configured to be displaceable relative to the cylindrical body; and
a fixing device configured to releasably fix the mobile body to the cylindrical body;
wherein the guide bush is connected to the mobile body so as to be moveable relative to the cylindrical body by displacement of the mobile body to adjust an inner diameter of the guide bush;
wherein the mobile body includes:
a connection member connected to the guide bush; and
an operation member to be releasably fixed to the cylindrical body, and configured to displace the connection member;
wherein the connection member and the operation member are connected together by an engagement section including a recessed portion and a projecting portion loosely fitted to each other such that the operation member is displaced without displacing the connection member when the operation member is fixed to the cylindrical body by the fixing device.

2. The guide bush adjusting device of claim 1, wherein the fixing device is configured to fix the mobile body by elastically enlarging a diameter of the operation member and pressing the operation member against the cylindrical body.

3. The guide bush adjusting device of claim 1, wherein the mobile body is displaceable in a rotational direction relative to the cylindrical body.

4. The guide bush adjusting device of claim 3, wherein the projection portion of the engagement section is a pin to be inserted into the recessed portion.

5. The guide bush adjusting device of claim 4,
wherein the recessed portion is a hole;
wherein the pin and the hole are loosely fitted together so as to be relatively displaceable within a predetermined range in a direction of movement of the mobile body; and
wherein the pin includes a retainer portion configured to prevent the pin from coming out of the hole, the retainer portion being formed of a tip end of the pin, which has passed through the hole, having a size larger than a size of the hole.

6. The guide bush adjusting device of claim 1, wherein the guide bush is non-rotatably and axially-moveably mounted in the cylindrical body, the connection member of the mobile body is threaded to the guide bush, and the mobile body is rotatably and non-axially moveably mounted in the cylindrical body such that rotation of the mobile body will screw or unscrew the connection member to the guide bush so as to move the guide bush axially relative to the cylindrical body.

* * * * *